(12) United States Patent
Zemlin

(10) Patent No.: US 7,246,695 B2
(45) Date of Patent: Jul. 24, 2007

(54) CONVEYOR APPARATUS FOR CONVEYING CLOSURE

(75) Inventor: Karl E. Zemlin, Indianapolis, IN (US)

(73) Assignee: Alcoa Closure Systems International, Inc., Crawfordsville, IN (US)

( * ) Notice: Subject to any disclaimer, the term of this patent is extended or adjusted under 35 U.S.C. 154(b) by 0 days.

(21) Appl. No.: 11/226,560

(22) Filed: Sep. 14, 2005

(65) Prior Publication Data

US 2007/0056828 A1  Mar. 15, 2007

(51) Int. Cl.
*B65G 47/24* (2006.01)

(52) U.S. Cl. .............................. 198/397.06; 198/867.11; 198/803.14

(58) Field of Classification Search ................ 198/393, 198/397.01, 397.06, 830.14, 867.14, 867.11, 198/803.14

See application file for complete search history.

(56) References Cited

U.S. PATENT DOCUMENTS

| | | | | | |
|---|---|---|---|---|---|
| 2,609,912 | A | * | 9/1952 | Engel | .................... 198/397.06 |
| 3,710,926 | A | * | 1/1973 | Santen | ................... 198/803.14 |
| 4,829,751 | A | * | 5/1989 | Tisma | .................... 198/867.11 |
| 5,127,514 | A | * | 7/1992 | Guttinger et al. | ....... 198/803.11 |
| 5,333,716 | A | * | 8/1994 | Hoppmann et al. | .... 198/397.06 |
| 5,333,718 | A | * | 8/1994 | Pannell et al. | ......... 198/397.06 |
| 5,394,972 | A | * | 3/1995 | Aidlin et al. | ................ 198/393 |
| 5,586,637 | A | * | 12/1996 | Aidlin et al. | ........... 198/397.06 |
| 5,975,369 | A | | 11/1999 | Yurkewicz et al. | |
| 6,491,152 | B1 | * | 12/2002 | Evers, Jr. et al. | ........ 198/397.01 |

* cited by examiner

*Primary Examiner*—James R. Bidwell
(74) *Attorney, Agent, or Firm*—Wood, Phillips, Katz, Clark & Mortimer

(57) ABSTRACT

A conveyor apparatus for conveying and orienting multi-diameter plastic closures includes a conveyor belt having a plurality of conveyor flights each having a channel configuration. Each conveyor flight includes a pair of spaced apart sidewalls which are spaced apart by a distance greater than a portion of the associated closure having a smaller diameter, but by a distance less than a larger diameter of the associated closure. By this arrangement, whereby each conveyor flight is engageable with each of the closures at generally diametrically opposed portions thereof, efficient and consistent handling and orientation of multi-diameter closures is facilitated.

6 Claims, 3 Drawing Sheets

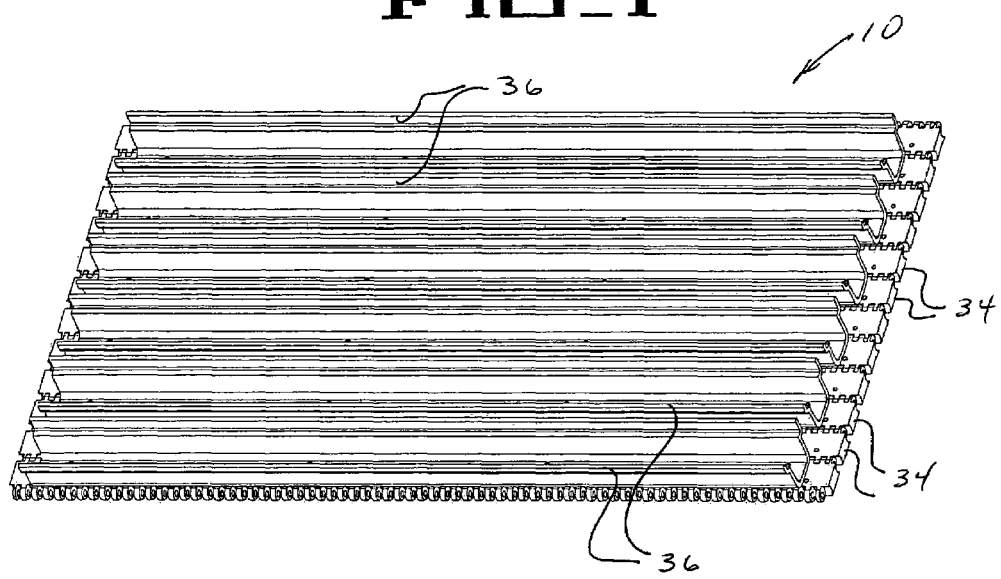
FIG_1
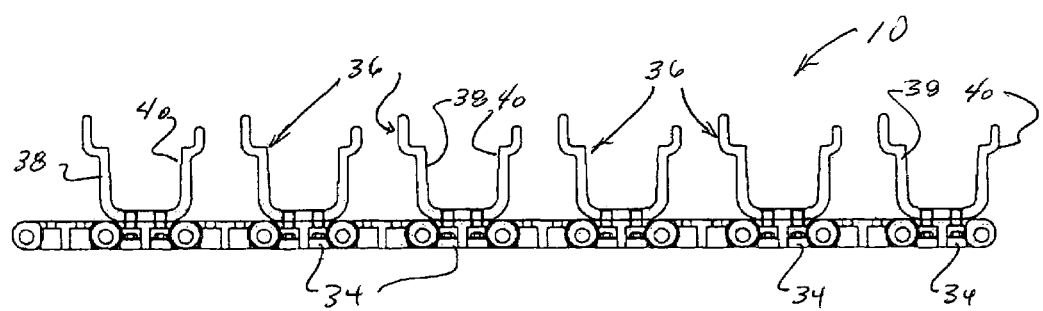
FIG_2

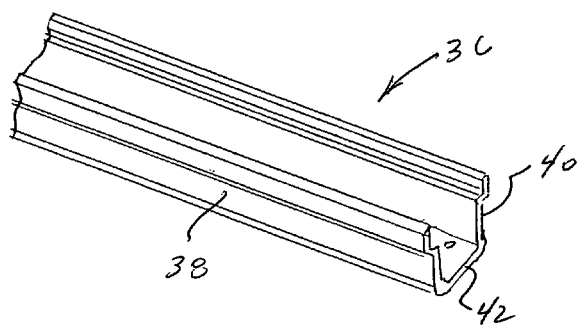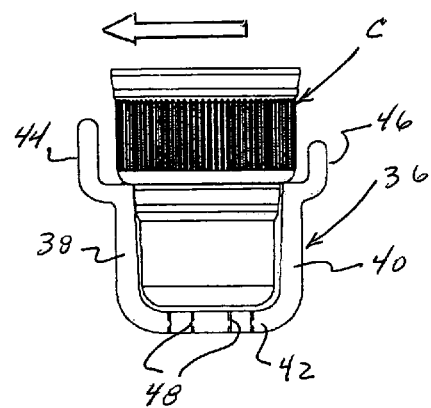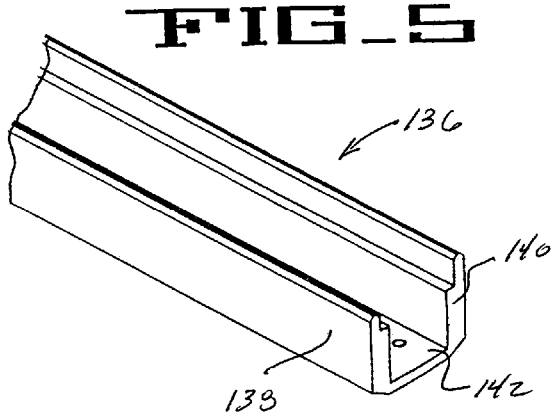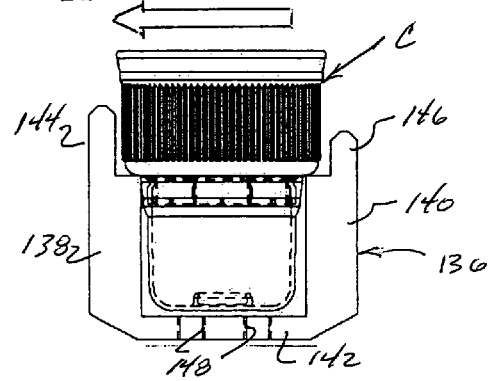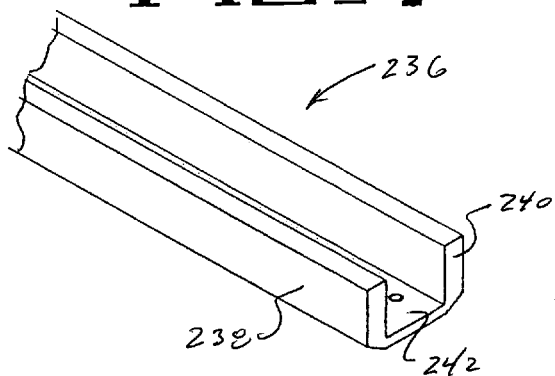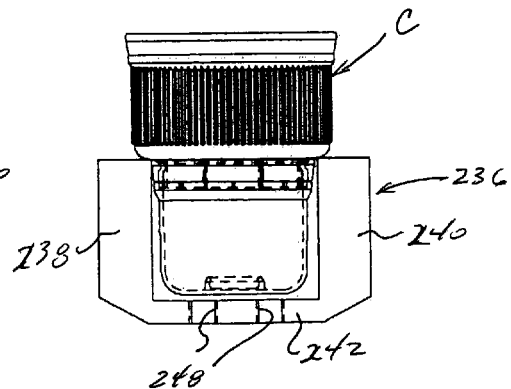

FIG_9
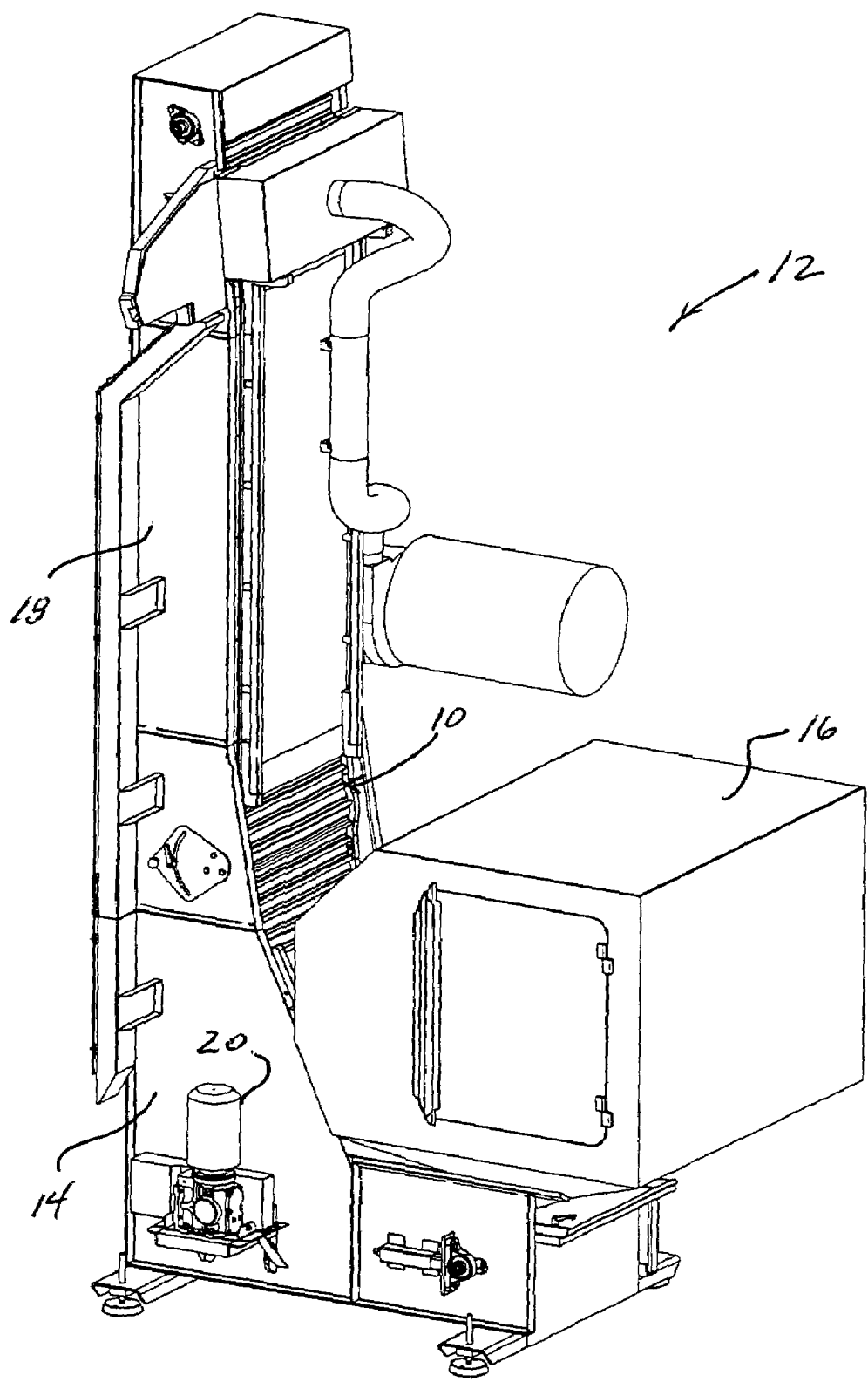

CONVEYOR APPARATUS FOR CONVEYING CLOSURE

TECHNICAL FIELD

The present invention relates generally to a conveyor apparatus for vertically conveying and orienting closures for associated containers, and more particularly to a conveyor apparatus for conveying multi-diameter closures which includes a plurality of conveyor flights having a channel configuration which efficiently receive, orient, and convey closures such as during manufacture, packaging, and application to associated containers.

BACKGROUND OF THE INVENTION

Plastic closures have found widespread acceptance among consumers for use with all types of containers, and in particular beverage containers with carbonated and non-carbonated beverages. Closures of this nature can desirably be configured to include tamper-evident features to ensure consumers that the container/closure package has been unopened, with threaded closures providing added versatility by permitting closures to be readily removed, and re-applied, as may be desired.

As the use of plastic closures on containers for beverages has become more widespread, use of so-called dispensing closures has also increased. Closures of this nature typically include a valve structure which permits the closure to be selectively opened and closed, without removal from the associated container, thereby facilitating selective dispensing of the contents of the associated container. The manner in which selective dispensing is facilitated has made such closures applicable for use with not only beverage containers, but also for containers having contents which are otherwise flowable.

U.S. Pat. No. 5,975,369, hereby incorporated by reference, illustrates a typical dispensing closure, such as for use on beverage containers, including a selectively operable valve mechanism. In particular, this type of closure includes an internally threaded lower base portion configured for fitment to an associated container, and an upper dispensing portion. The upper dispensing portion includes a so-called "push/pull" valve member, which when pulled away from the associated container permits the container contents to be dispensed through the closure, with pushing of the valve element toward the container closing the closure and the container contents.

As illustrated in the above-referenced patent, a closure of this type typically includes a generally cylindrical, protective dust cover which generally defines the outer dimensions of the upper portion of the closure assembly during handling, including storage and application, of the closure. The dust cover can be easily removed when it is desired to operate the valve structure of the closure for dispensing, and if desired, can be readily reapplied to the closure after initial opening to maintain the cleanliness of the valve structure.

In the configuration of the closure illustrated in the above-referenced patent, the closure exhibits a generally stepped, multi-diameter configuration, that is, including the upper portion defined by the dust cover, and the relatively larger lower portion defined by the internally threaded base portion of the closure. As will be appreciated, application of the multi-diameter closure to an associated container requires that the closure be oriented such that the internally threaded base portion can be positioned for cooperative engagement with the associated threaded neck portion of a container, with the closure and container relatively rotated for closure application.

To this end, conveyor arrangements are known which are intended to facilitate transport and handling of this type of closure, while orienting the closures for subsequent application to associated containers. By way of example, U.S. Pat. No. 5,586,637, hereby incorporated by reference, illustrates a conveyor assembly which includes an articulatable conveyor belt for receiving, orienting, and vertically transporting stepped or multi-diameter dispensing closures such as described above. However, experience has shown that this type of conveying device does not provide the desired close contact between the conveyor belt and associated closures which is required in order to maintain control of the closures as the conveyor belt advances through the apparatus.

Accordingly, the present invention is directed to an improved conveyor apparatus for conveying multi-diameter closures which desirably acts to orient and closely control closures as they are conveyed, thus desirably facilitating efficient handling and orientation of the closures for subsequent application.

BACKGROUND OF THE INVENTION

A conveyor apparatus embodying the principles of the present invention is particularly suited for handling closures having a so-called multi-diameter configuration, including an upper portion and a relatively larger lower portion. Notably, the present conveyor apparatus includes a plurality of conveyor flights, each having a channel configuration, with each flight desirably configured to engage each associated closure at multiple portions of the closure, generally at diametrically opposed portions thereof, thus desirably enhancing control and positioning of each closure after each closure is oriented by cooperation with the respective one of the conveyor flights. Efficient handling, particularly during vertical transport of the closures, is greatly facilitated.

In accordance with the illustrated embodiment, the present conveyor apparatus includes a conveyor belt comprising a plurality of pivotally interconnected conveyor belt elements. The pivotally interconnected conveyor belt elements thus configure the conveyor belt for articulation, as the belt is driven and guided through the conveyor apparatus. In a typical application, the conveyor belt moves from an associated feed hopper, at which a bulk supply of the closures is oriented and transferred by the conveyor belt, along a vertically oriented portion of the conveyor belt path, with the oriented closures ultimately discharged from the conveyor apparatus at a discharge station positioned above the feed hopper. The discharged closures are maintained in the desired orientation for subsequent application to respective containers.

In accordance with the present invention, the conveyor belt of the conveyor apparatus includes a plurality of conveyor flights connected to at least some of the conveyor belt elements. Notably, each of the conveyor flights has a channel configuration, including a pair of spaced apart sidewalls, and a base web extending between and interconnecting the sidewalls. The sidewalls are spaced apart by a distance greater than a diameter of the upper portion of each associated closure, with the sidewall spacing being less than a diameter of the lower portion of each closure. By this configuration, each of the sidewalls of each conveyor flight defines an edge portion engageable with the lower portion of each closure, as each closure is received within one of the conveyor flights in its desired, generally inverted orientation. Subsequently, as the closures are moved vertically by the conveyor apparatus, each of the channel-like conveyor flights engages plural, generally diametrically opposed portions of each correctly oriented closure, while closures which are improperly oriented fall by gravity from the conveyor belt into the bulk supply for eventual conveyance.

In accordance with the presently preferred embodiment of the present invention, each of the sidewalls of each conveyor flight has a stepped configuration, and includes an extension extending from the respective edge portion of the sidewall. The extensions of the conveyor flight are spaced apart by a dimension greater than the diameter of the lower base portion of each of the closures, to thereby receive the lower portion of each closure between the sidewall extensions. In one embodiment, each of the extensions of the sidewall is offset from the remaining portion of the respective sidewall, while in an alternative embodiment, each of the sidewall extensions has an outwardly facing surface aligned with an outwardly facing surface of the remaining portion of the respective sidewall.

In order to further facilitate the desired orientation and retention of the closures as they are carried by the conveyor flights, the sidewall extensions of each conveyor flight respectively correspond to leading and trailing portions of each flight, referring to the direction of movement of the conveyor flights as the conveyor apparatus is operated. In particular, the one of the extensions corresponding to the leading portion of the flight extends a greater distance from the base web of the conveyor flight than the other one of the respective extensions.

In a presently preferred embodiment, each of the conveyor flights comprises an extrusion to facilitate efficient and accurate formation, thereby facilitating cost-effective, and reliable handling and orientation of the illustrated multi-diameter closures.

Other features and advantages of the present invention will become readily apparent from the following detailed description, the accompanying drawings, and the appended claims.

BRIEF DESCRIPTION OF THE DRAWINGS

FIG. 1 is a perspective view of a portion of the conveyor belt of the present conveyor apparatus;

FIG. 2 is a side elevational view of the conveyor belt shown in FIG. 1;

FIG. 3 is a fragmentary, perspective view of a conveyor flight of the conveyor belt shown in FIGS. 1 and 2;

FIG. 4 is a side elevational view of the conveyor flight shown in FIG. 3, illustrated with an associated multi-diameter closure;

FIG. 5 is a fragmentary, perspective view of an alternate embodiment of a conveyor flight of the present invention;

FIG. 6 is a side elevational view of the conveyor flight shown in FIG. 5;

FIG. 7 is a fragmentary, perspective view of a further embodiment of a conveyor flight of the present invention;

FIG. 8 is a side elevational view of the conveyor flight shown in FIG. 7; and FIG. 9 is a side elevational view of an exemplary conveyor apparatus embodying the principles of the present invention.

DETAILED DESCRIPTION

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiments illustrated.

With reference to FIG. 1, therein is illustrated a portion of a conveyor belt 10 of a conveyor apparatus embodying the principles of the present invention. Conveyor belt 10 is configured to cooperate with associated dispensing closures, designated C, having a generally stepped, multi-diameter configuration. Closures of this nature include a push/pull valve structure which can be selectively operated to permit consumers to dispense the contents of an associated container, such as a beverage of the like. U.S. Pat. No. 5,975,369, hereby incorporated by reference, illustrates a multi-diameter dispensing closure of this nature.

The conveyor belt 10 is part of a conveyor apparatus 12, such as configured in accordance with the illustration of FIG. 9. Conveyor apparatus 12 is configured for receiving, orienting, and vertically moving the closures C, such as attendant to handling of bulk closures for orientation and subsequent application to respective containers. To this end, the apparatus 10 includes a housing 14 for supporting and guiding the conveyor belt 10, with the conveyor belt being guided about suitable guide rollers for movement along a predetermined path. The conveyor belt moves along a lower run generally beneath a supply hopper 16 which retains bulk quantities of the closures C in random orientations.

The conveyor belt 10 moves from generally beneath the supply hopper 16 along an inclined run up and into a vertically oriented portion of the conveyor apparatus. As the conveyor belt moves along this predetermined path, closures are received on the belt generally beneath the supply hopper 16, with those closures not in the desired orientation generally falling and being dislodged from the conveyor as the conveyor belt moves vertically along the inclined run into the vertically oriented portion of the apparatus. As will be further described, those closures C which are correctly oriented are retained by the conveyor belt, and conveyed upwardly through the apparatus for eventual discharge, in the desired orientation, at a discharge station positioned above the storage hopper 16. A suitable drive motor 20 effects driven movement of the conveyor belt 10, with the conveyor belt returning downwardly from the upper portion along a return run. A conveyor apparatus 10 such as illustrated may be configured in accordance with the teachings of U.S. Pat. No. 5,586,637, hereby incorporated by reference.

With particular reference to FIGS. 1 and 2, details of the conveyor belt 10 of the present apparatus for facilitating handling and orientations of closure C will now be described. As illustrated in FIG. 1, conveyor belt 10 comprises a plurality of pivotally interconnected conveyor elements 34 with the conveyor belt 10 further including a plurality of conveyor flights 36 specifically configured for efficient handling and retention of the oriented closures C. As illustrated, each of the conveyor flights 36 has a channel configuration, including a pair of spaced apart sidewalls 38, 40, and a base web 42 extending between and interconnecting the sidewalls. While conveyor elements 34 and the respective conveyor flights 36 are shown as separate components in the illustrated embodiments, which facilitates efficient manufacture and assembly, it is within the purview of the present invention that each conveyor element and its respective flight can be provided in the form of a single, unitary component.

As best illustrated in FIG. 4, each conveyor flight 36 is configured such that the sidewalls 38, 40 are spaced apart by a dimension which is greater than the diameter of the upper portion (e.g., dust cover) of the associated container C, but less than the diameter of the lower portion (e.g., threaded base portion) of each closure C. Thus, as illustrated in FIG. 4, each of the sidewalls defines an inner edge portion engageable with the lower portion of the associated closure.

In this presently preferred embodiment, each of the sidewalls 38, 40 has a stepped configuration, and includes a respective extension 44, 46 extending from the respective edge portion of the sidewall. As will be observed, the extensions 44, 46 of each conveyor flight 36 are spaced apart by a dimension greater than the diameter of the lower, base portion of each closure C, to thereby receive the lower portion of the closure between the extensions.

As will be appreciated, the orientation of the conveyor flight 36, and associated closure C, illustrated in FIG. 4, generally corresponds to the upwardly open configuration of the conveyor flight as it moves through the conveyor apparatus generally beneath the supply hopper 24 in which the closures C are randomly oriented. As the conveyor flight moves beneath the bulk quantity of the closures C, some of the closures are received within the conveyor flight in the desired, generally inverted orientation illustrated in FIG. 4, while other ones of the closures may be partially received in the conveyor flight, and moved therewith. As will be appreciated, the illustrated configuration of the conveyor flight, wherein sidewalls 38, 40 are spaced to receive the upper portion of the closure, but have a spacing which is less than the diameter of the lower threaded portion of the closure, precludes closures from being fully received within the conveyor flight in other than the desired orientation.

As the closures are advanced by movement of the conveyor belt 10, those closures which are not fully seated and properly oriented in each conveyor flight 36 tend to fall by gravity from the conveyor belt back into supply hopper 24. In the preferred form, retention of properly oriented closures in the conveyor flight 36 is facilitated by configuring one of the extensions 44, 46 to have a greater dimension. In particular, with respect to the arrow in 24 illustrating the direction of motion of the conveyor flight 36, the sidewall extensions 44, 46 respectively correspond to leading and trailing portions of the conveyor flight 36. Thus, it will be observed that the extension 44 corresponding to the leading edge of the flight extends a greater distance from the base web 42 than the other one of the respective extensions 46. This configurations of the conveyor flight has found to desirably enhance stable conveyance of the oriented closures C as they move vertically through the conveyor apparatus 12.

This embodiment of the conveyor flight 36 can be efficiently formed by extrusion, and as illustrated, is configured such that each of the sidewall extensions 44, 46 is offset from the remaining portion of the respective one of the sidewalls. Economy of manufacture and efficient use of material is thus facilitated.

As illustrated, the base portion 42 of the conveyor flight 36 preferably defines a plurality of openings 48 for receiving therethrough suitable mechanical fasteners for securing each of the conveyor flights to a respective one of the conveyor belt elements 34.

With reference now to FIGS. 5 and 6, therein is illustrated an alternate embodiment of a conveyor flight of the present conveyor apparatus, designated 136, with elements of the conveyor flight 136 like those in the previously-described embodiment designated by like reference numerals in the one-hundred series.

Accordingly, conveyor flight 136 includes a pair of sidewalls 138, 140 spaced apart by a dimension greater than the diameter of the upper portion of closure C, but less than the diameter of the lower portion of the closure C. The conveyor flight 136 further includes a base portion 142 extending between and interconnecting the sidewalls 138, 140.

By this relative spacing of the sidewalls 138, 140, the conveyor flight 136 has a channel configuration, with each of the sidewalls defining an edge portion engageable with the lower portion of the associated closure C.

As in the previous embodiment, each of the sidewalls 138, 140 has a stepped configuration, and includes an extension 144, 146, extending from the respective edge portion of the sidewall. As illustrated, the extensions 144, 146 of each conveyor flight 136 are spaced apart by a dimension greater than the dimension of the lower portion of the associated closures C, to thereby receive the lower portion of the closure between the extensions. In distinction from the previous embodiment, each of the extensions 144, 146 of this embodiment has an outwardly facing surface aligned with the outwardly facing surface of the remaining portion of the respective sidewall. As illustrated, the base web 142 of the conveyor flight 136 defines a plurality of openings 148 for receiving therethrough suitable mechanical fasteners for securing the conveyor flight to a respective one of conveyor belt elements 34.

As in the previous embodiment, the sidewall extensions 144, 146 are configured to facilitate the desired orientation and retention of closures C as they are carried by the conveyor belt, and to this end, sidewall extensions 146 and 144 respectively correspond to leading and trailing edge portions of flight 136, wherein the one of the extensions corresponding to the trailing portion, i.e., extension 144, extends a greater distance from the base web 142 than the one of the respective extensions, i.e., extension 146, extends from the base web 142.

Referring to FIGS. 7 and 8, therein is illustrated a further embodiment of the conveyor flight of the present conveyor apparatus, designated 236, with elements of the conveyor flight 36 corresponding to those elements of the previously described embodiments designated by like reference numerals in the two-hundred series.

As illustrated, the conveyor flight 236 has a channel configuration, and includes a pair of spaced apart sidewalls 238, 240, and a base web 242 extending in between and interconnecting the sidewalls. The sidewalls 238, 240 are spaced apart by a distance greater than the diameter of the upper portion of the associated closures C, and less than the diameter of the lower portion of the closure, with each of the sidewalls thus defining an inner edge portion engageable with the lower portion of each closure. As will be observed, this embodiment of the conveyor flight of the present invention has a generally symmetrical configuration, with sidewalls 238, 240 being substantially identically configured. The base web 242 of the conveyor flight 236 defines a plurality of openings 248 for receiving therethrough suitable mechanical fasteners for securing the conveyor flight to a respective one of the conveyor belt elements 34.

Thus, a conveyor apparatus embodying the principles of the present invention is configured to desirably enhance consistent and efficient handling and orientation of closures, particularly multi-diameter closures such as dispensing closures illustrated herein. The channel-shaped profile of the conveyor flights configured in accordance with the present invention can be attached to a single conveyor element, or link, of the conveyor belt of the apparatus, with the width of the channel sized to control the object being sorted and oriented at a single, critical diameter, with the depth of the channel selected so that a perpendicular face of the flight will control how deep the object is seated within the channel. By virtue of the channel configuration, the width of the channel can be controlled very closely without being impacted by the path of the conveyor, in contrast to arrangements previously known, wherein, close contact required for desired control of an object is not always achieved, in view of non-constant spacing between contact surfaces of adjacent conveyor flights as the associated conveyor belt deviates from a straight line. In such previous arrangements, the accommodation of variation due to belt flex can undesirably result in inadequate control of parts being sorted.

By the present invention, close control of each closure is desirably maintained by engagement with plural, generally diametrically opposed portions of each closure, although such portions need not be at opposite sides of the same one of the multiple diameters of the closure. For example, during transport of each correctly oriented closure, the leading portion of the respective conveyor flight may engage the upper (dust cover) portion of the closure, while the trailing portion of the respective flight simultaneously engages the larger, lower (base) portion of the closure. The conveyor flights can be configured to engage diametrically opposed portions of the upper (dust cover) portion of each closure.

From the foregoing, it will be observed that numerous modifications and variations can be effected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. A conveyor apparatus for conveying closures, each having an upper portion and a relatively larger lower portion, comprising:
    a conveyor belt comprising a plurality of pivotally interconnected conveyor belt elements, and a plurality of conveyor flights respectively connected to at least some of said conveyor belt elements,
    each of said conveyor flights having a channel configuration, including a pair of spaced apart sidewalls, and a base web extending between and interconnecting said sidewalls, said sidewalls being spaced apart by a distance greater than a diameter of said upper portion of each said closure, and less than a diameter of said lower portion of each said closure, with each of said sidewalls defining an edge portion engageable with the lower portion of each said closure,
    wherein each said sidewall has a stepped configuration and includes an extension extending from the respective edge portion of the sidewall, said extensions of each said conveyor flight being spaced apart by a dimension greater than the diameter of the lower portion of each said closure to thereby receive the lower portion of the closure between the extensions,
    the sidewall extensions of each said conveyor flight respectively corresponds to leading and trailing portions of each said flight, wherein the one of said extensions corresponding to the leading portion of the flight extends a greater distance from said base web than the other one of the respective extensions.

2. A conveyor apparatus in accordance with claim 1, wherein:
    each of said extensions of each said sidewall is offset from the remaining portion of the respective sidewalls.

3. A conveyor apparatus in accordance with claim 2, wherein:
    each of said extensions of each said sidewall has an outwardly facing surface aligned with an outwardly facing surface of the remaining portion of the respective sidewall.

4. A conveyor apparatus in accordance with claim 1, wherein:
    said base web of each of said conveyor flight defines a plurality of openings for receiving therethrough mechanical fasteners for securing each said conveyor flight to a respective one of said conveyor belt elements.

5. A conveyor flight for a conveyor apparatus for conveying multi-diameter closures, each having an upper portion and a relatively larger lower portion, comprising:
    a pair of spaced apart sidewalls and a base web extending between and interconnecting said sidewalls, said sidewalls being spaced apart by a distance greater than a diameter of said upper portion of each said closure, and less than a diameter of said lower portion of each said closure,
    each said sidewall having a stepped configuration, and including an extension extending from the respective edge portion of the sidewall, said extensions of each said conveyor flight being spaced apart by a dimension greater than the dimension of the lower portion of each said closure to thereby receive the lower portion of the closure between said extensions, each of said conveyor flights engageable with each of said closures at generally diametrically opposed portions thereof,
    wherein the sidewall extensions of each said conveyor flight respectively correspond to leading and trailing portions of the conveyor flight, wherein the one of the extensions corresponding to the leading portion of the flight extends a greater distance form the base web than the other one of the respective extensions, said conveyor flight comprising a unitary extrusion.

6. A conveyor flight for a conveyor apparatus for conveying multi-diameter closures in accordance with claim 5, wherein:
    each of said extensions of each said sidewall is offset from the remaining portion of the respective sidewall.

* * * * *